W. MacGLASHAN.
SPARK OR THROTTLE CONTROL.
APPLICATION FILED FEB. 4, 1915.
1,177,198.
Patented Mar. 28, 1916.
2 SHEETS—SHEET 1.
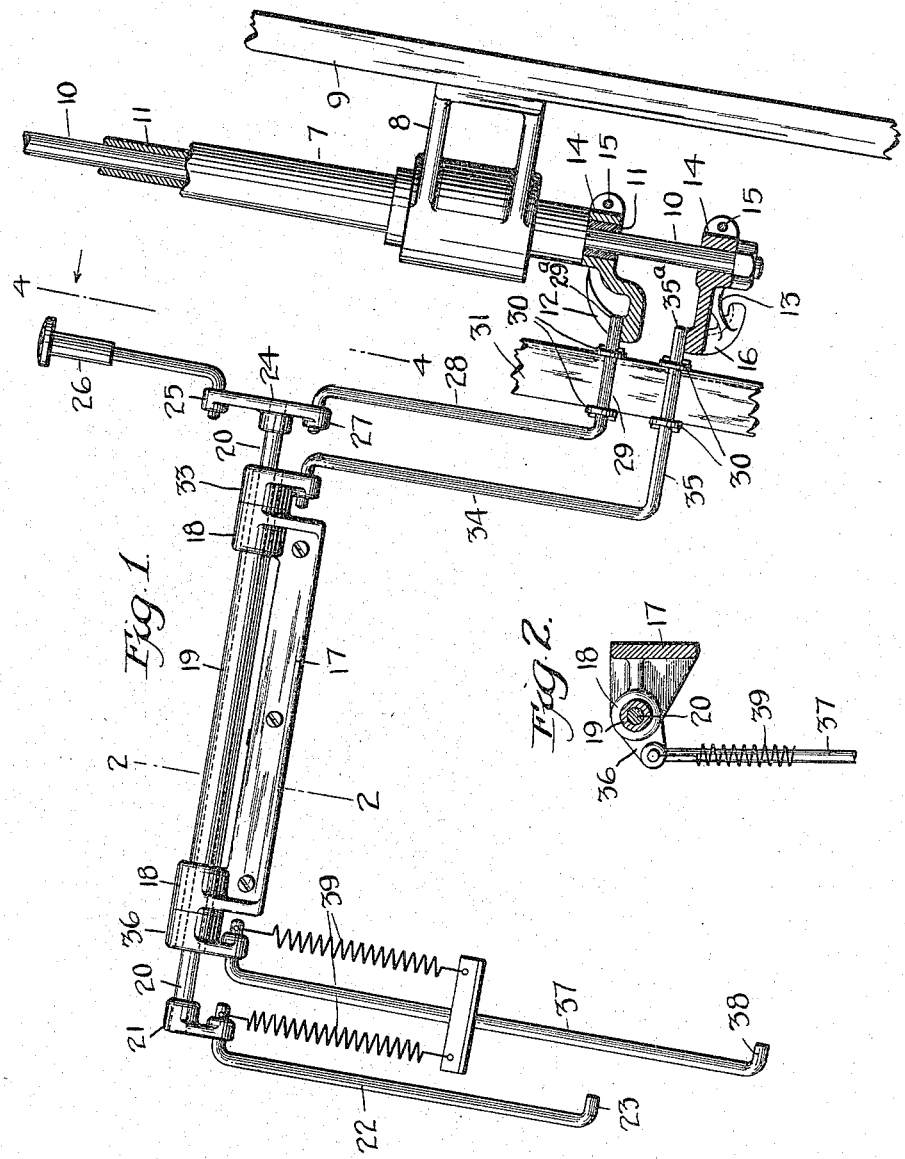

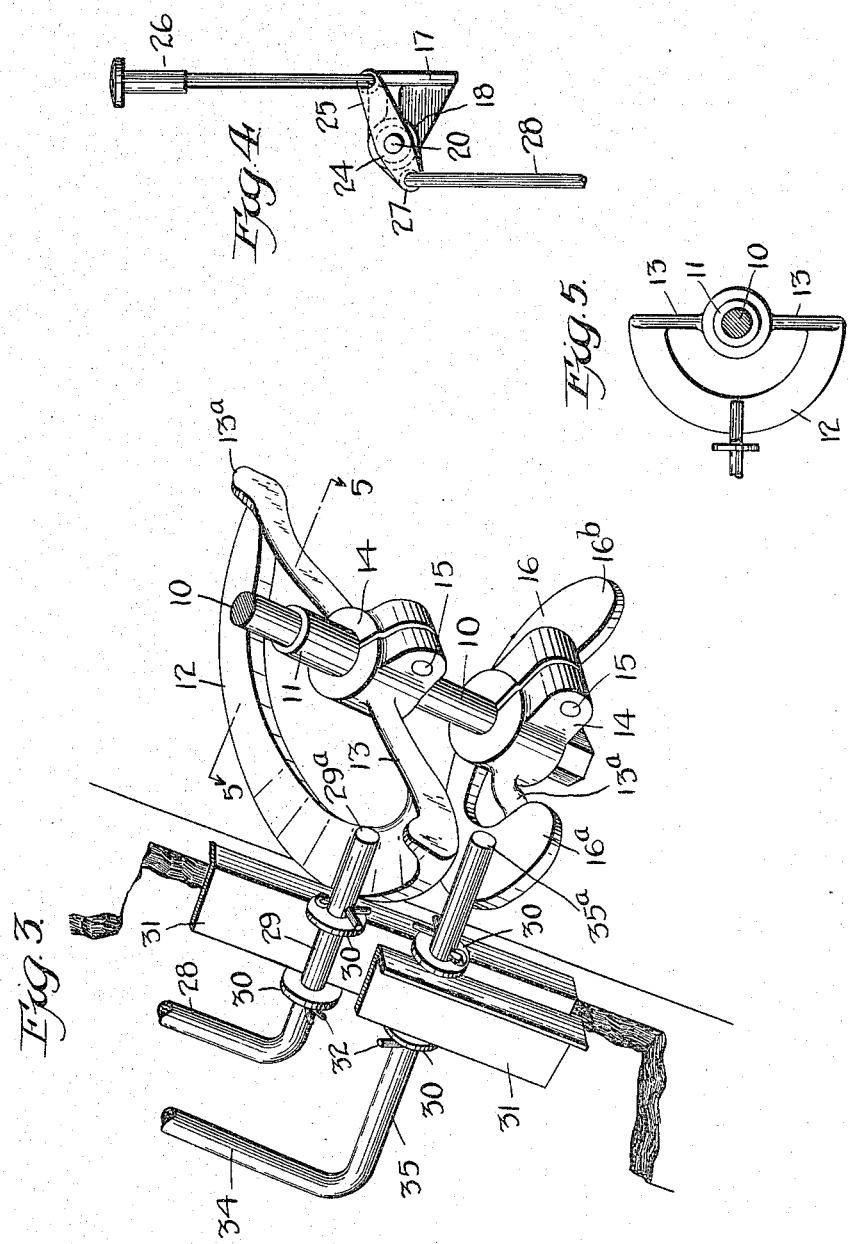

UNITED STATES PATENT OFFICE.

WILLIAM MacGLASHAN, OF DETROIT, MICHIGAN, ASSIGNOR TO THE STUDEBAKER CORPORATION, A CORPORATION OF NEW JERSEY.

SPARK OR THROTTLE CONTROL.

1,177,198.   Specification of Letters Patent.   Patented Mar. 28, 1916.

Application filed February 4, 1915. Serial No. 6,180.

*To all whom it may concern:*

Be it known that I, WILLIAM MACGLASHAN, a citizen of the United States of America, and resident of the city of Detroit, county of Wayne, State of Michigan, United States of America, have invented certain new and useful Improvements in Spark or Throttle Control, of which the following is a specification.

This invention is a combined spark and throttle control especially adapted for conveyances employing internal combustion engines, and has for its main object to simplify the construction and operation of such devices with a minimum of parts.

The invention contemplates the provision of throttle controlling means which can be actuated by hand from the steering wheel or controlled through a foot lever, and also in the provision of spark control means having its governing element positioned on the steering wheel, the spark and throttle having separate rotatable members carried by the steering post, each of which actuates controlling levers through cam acting devices whereby a gradual and positive operation of the parts may be effected.

Other objects and advantages of the invention will appear from the following detailed description of the invention taken in connection with the appended claims.

The invention consists in the provision of a plurality of rocker elements, one connected with the throttle and the other with the spark, the rocking elements being maintained in predetermined positions by resilient means to retain the spark and throttle at rest. The rocking elements are separately actuated from rotatable members carried by the steering post, such movement being gradually and positively effected, through cam-like devices engaging rocker rods. The throttle rocker element may also be actuated by reciprocating means from a foot pedal.

To enable those skilled in the art to better understand the invention, one embodiment thereof is illustrated in the accompanying drawings showing the device as adapted for a motor vehicle, although it is to be understood that such disclosure is for the purposes of illustration only, and not as defining the limits of the invention.

In the drawings: Figure 1 is a plan view, parts being in section and broken away, of the mechanism to control the spark and throttle of an internal combustion engine. Fig. 2 is a detail sectional view through one of the brackets disclosing the concentric rocker elements. Fig. 3 is an enlarged detail view of the lower end of the steering post disclosing the cam-acting devices engaging angular ends of the rocker rods, and means to guide the movement of the rods. Fig. 4 is a detail side elevation of the foot pedal. Fig. 5 is a plan view showing an end of the rocker rod riding upon a sector cam.

In the device disclosed in the accompanying drawings, the parts are arranged more particularly for use on a motor vehicle, wherein the steering post is indicated at 7 supported by a suitable bracket 8 from a part of the vehicle 9. The steering post may be of the usual character and provided with a central rod 10 which may be actuated by any preferred means on the usual steering wheel, not shown, to rotate the rod 10. Concentric with this rod is shown a sleeve 11, operated from steering wheel in manner similar to the operation of rod 10, having at its lower end a cam-acting device 12 adjustably mounted thereon. This cam-acting device is shown more clearly in Fig. 3 as comprising bracket arms 13 which are secured to a sleeve 14 having suitable means such as a screw 15 to secure the sleeve 14 firmly to the member 11. To the bracket arms 13 is connected a cam-acting device, shown as a sector plate 12, which is preferably curved transversely and extends from one of the bracket arms 13, which is on one plane, to the other bracket arm 13ᵃ on a higher plane.

To the rotatable post 10 is secured a similar cam-acting device to that just described, except that in the embodiment disclosed in the drawings, the cam sectors 16 are reversely positioned, that is, the lower sector has one of its ends 16ᵃ so arranged on the bracket arms 13 and 13ᵃ that it will be in juxtaposition to a similar end of the upper sector when in one of their operative positions, such as illustrated in Fig. 3. When in this position, however, the opposite end 16ᵇ will be farthest away from the similar end of the upper sector. While this arrangement is preferable in some types of devices of this character, it should be understood that the invention is not limited to this specific detail.

Suitably mounted upon a part of the vehicle is a bracket 17 shown in the form of a plate, which is provided with bearings 18 to support a revoluble sleeve 10. Extending through this sleeve is shown a shaft 20. At one end of shaft 20 is shown a lever 21 which is secured firmly to the shaft 20, and at the outer end of this lever suitable means is secured, such as a pull rod 22, which is pivotally mounted in a bracket 21 at one end thereof, while its opposite end 23 may be connected to suitable means to control the throttle. The other end of rod 20 is shown provided with a lever 24 which is fulcrumed on the shaft 20, and to one end 25 of lever 24 is pivotally connected a foot pedal 26, shown in Figs. 1 and 4. To the opposite end 27 of the lever 24 is shown pivotally connected, a rocker rod 28 which may be provided with an angular lower end 29. This end may be provided with guide elements 30 to maintain the rocker rod in operative position with relation to the guide plate 31, and the end 29 is further extended to contact with the surface of one of the cam-acting elements 12, such as an upper sector plate. The guiding element 31 may be in the form of a plurality of angular plates, such as shown in Fig. 3, which permits of the reciprocal movement of the rods 28, and the elements 30 of the end 29 may be retained in position by any suitable means, such as the cotter pins 32. By this arrangement shaft 20 may be rocked either through the foot pedal 26, which would not interfere with the sector cam action 12, or it may be controlled by hand from the steering wheel through the sector plate 12 and the end 29ª engaging such plate, which would not interfere with the foot pedal, either of which levers would control the action of the throttle through the pull rod 22.

The outer rotatable element 19 is provided with a bracket 33 which is shown provided with a rocker rod 34 pivotally mounted thereto. The lower end of the rocker rod 34 is shown bent to form an angular end 35 which extends between the guide plates 31, with its extremity 35ª adapted to ride upon lower sector plate 16. This end 35 may be provided with similar guide elements 30 as described, with the other rocker rod 28 to maintain the rod in operative position with relation to the cam acting device which is mounted on the rotatable rod 10. The opposite end of the rocker element 19 is provided with a lever 36 secured thereto, with which element is connected a pull rod 37. The other end of the pull rod 37 is connected in any suitable manner at 38 to the spark mechanism, whereby the rotation of the rod 10 will actuate the pull rod 37 to control the action of the spark. The pull rods 22, 37 are provided with suitable means to retain them in a predetermined position, and one means for accomplishing this result is shown in Figs. 1 and 2 wherein the ends of the rods 22, 37 are connected to the brackets 21, 36 by resilient elements 39, the opposite ends of said elements being secured to a base plate 40.

It is thought the operation of the device will be clearly understood from the foregoing description taken in connection with the drawings, but for the sake of clearness, should the throttle be desired to be operated, the sleeve 11 may be rotated by hand control means in any preferred manner to turn said sleeve which will actuate the cam acting device 12 to engage the end 29ª of rocker rod 28, which through the lever 24 will rock the element 20. This action will cause the pull rod 22 to engage the throttle controlling means. If, however, the hands are engaged in other duties, the shaft 20 may be rocked by means of the foot pedal 26, which action will in no wise interfere with the hand control means 11, 12, 28. Moreover, the foot pedal 26 acts in the capacity of an accelerator. And when the foot pedal 26 is released the rod 29ª returns to its former position on the sector plate 12; hence the gas supply is normally controlled by the position of the sector plate 12, but by means of the foot pedal 26, the operator is free to accelerate the motor temporarily by increasing the supply of gas by operating the foot pedal 26.

Having thus described my invention, what I claim as new and desire to secure by Letters Patent is:

1. A device of the class described embodying a manually rotatable post, a cam fixed on said post and movable therewith, in combination with a rock-shaft, a plurality of operating arms fixed thereto, an operating rod pivotally connected to one of said arms and provided with a trunnion engaging with the cam of the post, means for maintaining the trunnion in engagement with the cam, a guide for restricting the trunnion to movement longitudinally of the post whereby, when the post is rotated, the trunnion is operated to oscillate the rock-shaft, and a suitable connection secured to the other arm of said rock-shaft and operated thereby.

2. A device for controlling the engine of a self-propelled vehicle embodying a manually rotatable post concentric with the steering shaft of the vehicle and operable independently thereof, and a cam fixed on said post and movable therewith, in combination with a rock-shaft, a plurality of operating arms fixed thereto, an operating rod pivotally connected to one of said arms and provided with a trunnion engaging with the cam of the post, means for maintaining the trunnion in engagement with the cam, a guide for restricting the trunnion to movement longitudinally of the post whereby, when the post is rotated, the trunnion is operated to oscillate the rock-shaft, and a suitable connection secured to the other arm of said rock-shaft and operated thereby.

3. A device of the class described embodying a manually rotatable post, a cam fixed on said post and movable therewith, in combination with a rock-shaft, a plurality of operating arms fixed thereto, an operating rod pivotally connected to one of said arms and provided with a trunnion engaging with the cam of the post, means for maintaining the trunnion in engagement with the cam, a guide for restricting the trunnion to movement longitudinally of the post whereby, when the post is rotated, the trunnion is operated to oscillate the rock-shaft, a suitable connection secured to the other arm of said rock-shaft and operated thereby, and a foot pedal also secured to one arm of the rock-shaft for oscillating said shaft independently of the post, cam and trunnion.

Signed by me at the city of Detroit, Michigan, this 1st day of February, 1915.

WILLIAM MacGLASHAN.

Witnesses:
R. E. SCRATCH,
D. G. MASTICK.

Copies of this patent may be obtained for five cents each, by addressing the "Commissioner of Patents. Washington, D. C."